US008194560B2

United States Patent
Ji et al.

(10) Patent No.: US 8,194,560 B2
(45) Date of Patent: Jun. 5, 2012

(54) ACCESS POINT IDENTIFIER CONFIGURATION PROCEDURE

(75) Inventors: Tingfang Ji, San Diego, CA (US); Avneesh Agrawal, San Diego, CA (US); Aamod D. Khandekar, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 193 days.

(21) Appl. No.: 12/499,438

(22) Filed: Jul. 8, 2009

(65) Prior Publication Data

US 2010/0008258 A1      Jan. 14, 2010

Related U.S. Application Data

(60) Provisional application No. 61/080,010, filed on Jul. 11, 2008.

(51) Int. Cl.
G01R 31/08 (2006.01)
(52) U.S. Cl. ......................... 370/252
(58) Field of Classification Search ............... None
See application file for complete search history.

(56) References Cited

U.S. PATENT DOCUMENTS

| | | | | |
|---|---|---|---|---|
| 5,734,824 A | * | 3/1998 | Choi | 709/224 |
| 7,421,266 B1 | * | 9/2008 | Bruestle et al. | 455/411 |
| 7,751,339 B2 | * | 7/2010 | Melton et al. | 370/252 |
| 7,835,330 B2 | * | 11/2010 | Parker | 370/338 |
| 2005/0037775 A1 | * | 2/2005 | Moeglein et al. | 455/456.1 |
| 2005/0148368 A1 | | 7/2005 | Scheinert et al. | |
| 2006/0182075 A1 | * | 8/2006 | Brunner et al. | 370/338 |
| 2007/0268506 A1 | * | 11/2007 | Zeldin | 358/1.13 |
| 2007/0268516 A1 | * | 11/2007 | Bugwadia et al. | 358/1.15 |
| 2007/0297421 A1 | * | 12/2007 | Huseth | 370/400 |
| 2010/0180016 A1 | * | 7/2010 | Bugwadia et al. | 709/220 |

OTHER PUBLICATIONS

International Search Report & Written Opinion—US2009/050171—International Search Authority—European Patent Office—Jun. 10, 2010.
Nokia Corporation et al: "CSG Cell Identification for Mobility and Measurement Reporting" 3GPP Draft; R2-073920 CSG, 3rd Generation Partnership Project (3GPP), Mobile Competence Centre; 650, Route Des Lucioles; F-06921 Sophia-Antipolis Cedex; France, vol. RAN WG2, No. Shanghai, China; 20071002, Oct. 2, 2007, XP050136572 [retrieved on Oct. 2, 2007] paragraph [0002] paragraph [0004].
Ntt Docomo et al: "Cell ID Assignment for Home Node B" 3GPP Draft; R2-073374, 3rd Generation Partnership Project (3GPP), Mobile Competence Centre; 650, Route Des Lucioles; F-06921 Sophia-Antipolis Cedex; France, Athens, Grece, vol. R2-073374, No. 59, Aug. 20, 2007, pp. 1-5, XP002541822 the whole document.

* cited by examiner

*Primary Examiner* — Robert Wilson
(74) *Attorney, Agent, or Firm* — Jimmy Cheng (57) ABSTRACT

In an access point identifier configuration scheme, different procedures are used for configuring (e.g., updating) different types of access points. For example, the criteria used to determine which identifiers are to be assigned to mobile access points may be different than the criteria used to determine which identifiers are to be assigned to stationary access points.

42 Claims, 9 Drawing Sheets

ACCESS POINT IDENTIFIER CONFIGURATION PROCEDURE

CLAIM OF PRIORITY

This application claims the benefit of and priority to commonly owned U.S. Provisional Patent Application No. 61/080,010, filed Jul. 11, 2008, the disclosure of which is hereby incorporated by reference herein.

BACKGROUND

1. Field

This application relates generally to wireless communication and more specifically, but not exclusively, to an access point identifier configuration scheme.

2. Introduction

Wireless communication systems are widely deployed to provide various types of communication content such as voice, data, and so on. These systems may be multiple-access systems capable of supporting communication with multiple users by sharing the available system resources (e.g., bandwidth and transmit power). Examples of such multiple-access systems include code division multiple access ("CDMA") systems, time division multiple access ("TDMA") systems, frequency division multiple access ("FDMA") systems, 3GPP Long Term Evolution ("LTE") systems, and orthogonal frequency division multiple access ("OFDMA") systems.

Generally, a wireless multiple-access communication system can simultaneously support communication for multiple wireless access terminals (e.g., user equipment). Each terminal communicates with one or more access points (e.g., base stations, eNodeBs, etc.) via transmissions on forward and reverse links. The forward link (or downlink) refers to the communication link from an access point to an access terminal, and the reverse link (or uplink) refers to the communication link from an access terminal to an access point.

Each access point in the system is assigned an identifier (e.g., a physical cell identifier, PCID) that identifies the access point and its corresponding cell (or sector). In some implementations an identifier comprises a pilot pseudorandom noise ("PN") pattern (or offset). For example, a PN pattern may be a known signal pattern that appears as noise when viewed out of context. Accordingly, a pilot PN of an access point is the pseudorandom noise pattern of the access point and may be used to identify the access point to access terminals and other access points. Here, an access terminal in the system acquires the identifiers broadcast by nearby access points to learn which access points are in the area as well as the system parameters utilized to properly acquire a connection with each access point. In addition, access points may learn the identifiers of neighboring access points to facilitate hand-off of access terminals between cells.

Typically, a fixed quantity (e.g., 504) of access point identifiers is defined in a given system. Accordingly, in conventional network planning, an operator (e.g., an access point vendor, an administrator of a network, etc.) carefully assigns identifiers to access points to avoid conflicts or collisions. For instance, if two or more neighboring access points or access points within communications range of an access terminal possess identical or similar identifiers, a collision occurs. Such collisions may result in significant interference on a channel and may result in service disruption. To mitigate these collisions, identifiers may be dynamically configured (e.g., capable of change) based upon topology change of a network. However, it is preferred that dynamic network reconfiguration rarely be performed due to the associated service interruption.

In situations only involving stationary access points (e.g., access points at fixed locations), identifiers may be assigned to minimize or avoid collisions. For example, neighboring access points may be assigned identifiers such that, even with update procedures, no collisions occur.

In situations involving mobile access points or relay stations, network planning may be challenging. As a mobile access point changes locations (e.g., travels with a train, bus, boat, airplane, or other vehicle), it encounters different macro cells served by stationary access points. As movements of a mobile access point may be impractical to predict, collisions may occur if a mobile access point approaches a stationary access point with a similar identifier or two mobile access points with similar identifiers come into range of one another. Accordingly, there is a need for effective techniques for avoiding collisions in wireless networks.

SUMMARY

A summary of sample aspects of the disclosure follows. It should be understood that any reference to the term aspects herein may refer to one or more aspects of the disclosure.

The disclosure relates in some aspects to using different procedures for configuring (e.g., updating) access point identifiers of different types of access points. For example, one procedure may be used to configure access point identifiers for mobile access points while a different procedure may be used to configure access point identifiers for stationary access points.

Various configuration procedures may be used in accordance with the teachings herein. In some aspects, a different identifier space may be used for different types of access points. For example, to prevent collisions between mobile and stationary access points, mutually exclusive identifier spaces may be allocated for mobile and stationary access points. In some aspects, the frequency with which an identifier is configured may depend on the type of access point. For example, mobile access points may be updated more frequently than stationary access points. In some aspects, different algorithms (e.g., hash algorithms) are used to generate identifiers for different types of access points.

BRIEF DESCRIPTION OF THE DRAWINGS

These and other sample aspects of the disclosure will be described in the detailed description and the appended claims that follow, and in the accompanying drawings, wherein:

In accordance with common practice the various features illustrated in the drawings may not be drawn to scale. Accordingly, the dimensions of the various features may be arbitrarily expanded or reduced for clarity. In addition, some of the drawings may be simplified for clarity. Thus, the drawings may not depict all of the components of a given apparatus (e.g., device) or method. Finally, like reference numerals may be used to denote like features throughout the specification and figures.

DETAILED DESCRIPTION

Various aspects of the disclosure are described below. It should be apparent that the teachings herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. Furthermore, an aspect may comprise at least one element of a claim.

Figure 1:
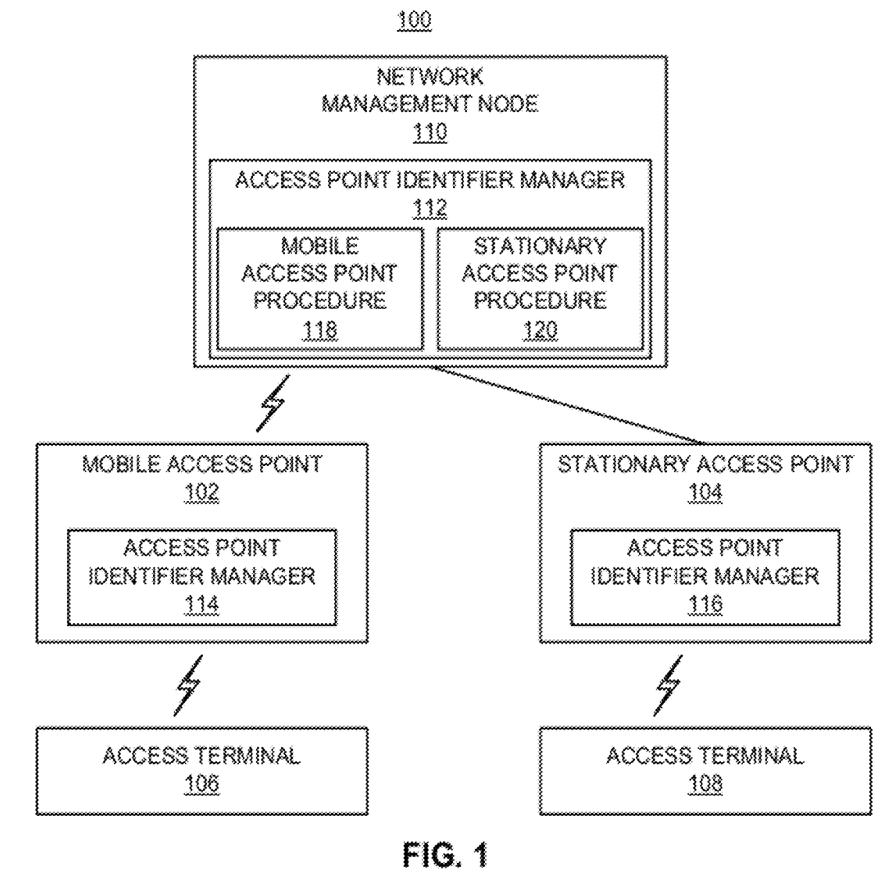
FIG. 1 is a simplified block diagram of several sample aspects of a communication system where different procedures are used for configuring identifiers of different types of access points.

FIG. 1 illustrates several nodes in a sample communication system 100 (e.g., a portion of a communication network). For illustration purposes, various aspects of the disclosure will be described in the context of one or more access terminals, access points, and network nodes that communicate with one another. It should be appreciated, however, that the teachings herein may be applicable to other types of apparatuses or other similar apparatuses that are referenced using other terminology. For example, in various implementations access points may be referred to or implemented as base stations or eNodeBs, access terminals may be referred to or implemented as user equipment or mobile stations, and so on.

Access points (e.g., access points 102 and 104) in the system 100 provide one or more services (e.g., network connectivity) for one or more wireless terminals (e.g., access terminals 106 and 108) that may be installed within or that may roam throughout the coverage area of the access points. For example, at various points in time the access terminal 106 may connect to the access point 102 or the access point 104. Each of the access points 102 and 106 may communicate with one or more network nodes (represented, for convenience, by network management node 110) to facilitate wide area network connectivity. A network node may take various forms such as, for example, one or more radio and/or core network entities (e.g., an operations, administration, and maintenance server, a mobility management entity, or some other suitable network entity).

Each access point in the system 100 may be assigned an access point identifier. In various implementations such an identifier may comprise, for example, a cell identifier (e.g., a PCID) or a pilot PN offset. Since the number of identifiers in the system 100 may be limited, identifier collisions may occur when multiple access points in the same vicinity use the same identifier. As discussed above, such collisions may be more difficult to mitigate if the system 100 includes mobile access points (e.g., access point 102).

In some aspects a mobile access point is defined as an access point that may be moved during the course of normal operation. That is, the access point is intended to be operated when it is moving and/or upon being moved from one location to another. Here, a mobile access point may remain operational as it is being moved. Thus, a mobile access point may be distinguished from an access point that is disconnected, moved to a new location, and then re-activated.

In some aspects a mobile access point is defined as an access point that supports a wireless backhaul. For example, a mobile access point may include a wireless transceiver and associated antenna for sending and receiving backhaul communication (and/or other communication) to and from the network (e.g., a network node, another access point, and so on).

The system 100 employs access point identifier managers that configure the identifiers used by the access points in the system in a manner that reduces the likelihood of identifier collisions. In cases where the identifier configurations are centrally managed, an access point identifier manager 112 deployed at the node 110 may configure the identifiers used by a set of access points (e.g., the access points managed by the node 110). To this end, the access point manager 112 may cooperate with access point managers (managers 114 and 116, e.g., cell identifier updaters) deployed at access points (e.g., access points 102 and 104, respectively) in the system 100. For example, the manager 112 may select the identifier for the access point 102 and send the selected identifier to the manager 114, whereby the manager 114 updates the identifier of the access point 102 so that the access point 102 will broadcast the new identifier. In cases where the identifier configurations are managed, at least in part, in a distributed manner, the managers (e.g., managers 114 and 116) may play a larger role in selecting and configuring the identifiers. In these cases, each manager 114 and 116 may employ various configuration procedures depending on whether the manager is associated with a mobile access point or a stationary access point.

The system 100 employs different identifier configuration (e.g. update) procedures for different types of access points to reduce the likelihood that multiple access points in the same vicinity will use the same identifier. For example, the access point identifier manager 112 may use a mobile access point procedure 118 when configuring the identifier for a mobile access point and use a stationary access point procedure 120 when configuring the identifier for a stationary access point. These configuration procedures may take various forms in different implementations. For example, in some cases different identifier spaces are allocated for different types of access points. In some cases the identifiers associated with one type of access point may be configured more frequently than the identifiers associated with one type of access point. In some cases, different algorithms may be employed to generate the identifiers for different types of access points. These techniques are described in detail below at FIGS. 4-6.

Identifier management operations as taught herein may be performed by various nodes. Also, these operations may be performed by a single node, by multiple nodes independently, or by multiple nodes in cooperation. In some cases these operations may be performed by a centralized node (e.g., that manages the identifiers used by a set of access points). For example, in FIG. 1 the node 110 (e.g., the identifier manager 112) may control which identifiers are used by the access points 102 and 104. In some cases, the identifier manager 112 may cooperate with the identifier managers 114 and 116 to determine which identifiers are to be used. For example, the identifier managers 114 and 116 may send any information that they have that may be used to configure their identifiers or the identifiers of other access points to the identifier manager 112. In some cases (e.g., a decentralized system) the identifier managers at each access point may independently perform identifier management operations as taught herein. For example, the identifier manager 114 may independently determine whether, when, and how to configure the identifier for access point 102. Similarly, the identifier manager 116 may independently determine whether, when, and how to configure the identifier for access point 104. Accordingly, it should be appreciated that the identifier operations taught herein may be performed at one or more nodes in a system (e.g., network nodes, access points, etc.).

Sample operations of the system 100 will now be described in more detail in conjunction with the flowchart of FIG. 2 and the sample components shown in FIG. 3. For convenience, the operations of FIG. 2 (or any other operations discussed or taught herein) may be described as being performed by specific components (e.g., components of the system 100 and/or depicted in FIG. 3). It should be appreciated, however, that these operations may be performed by other types of components and may be performed using a different number of components. It also should be appreciated that one or more of the operations described herein may not be employed in a given implementation.

Figure 3:
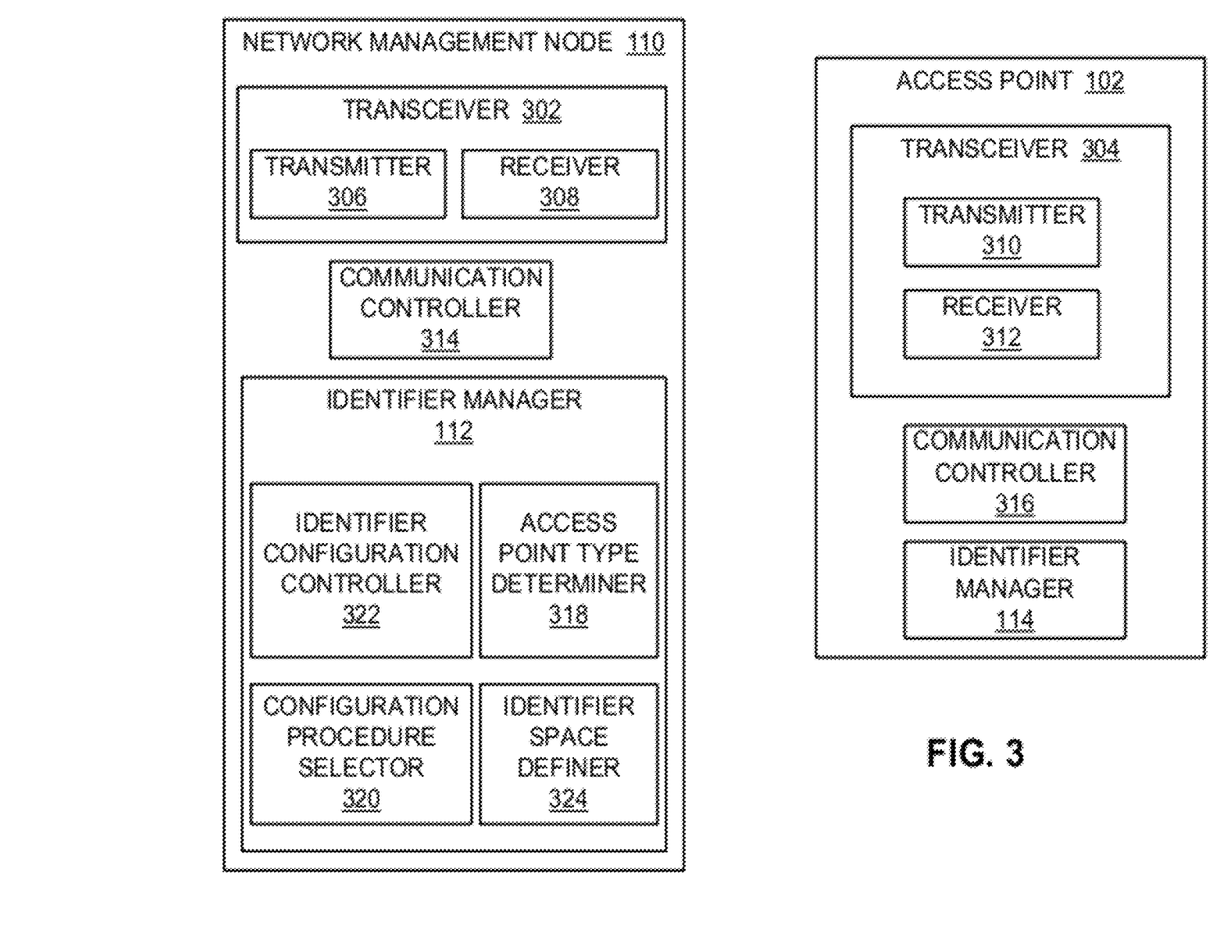
FIG. 3 is a simplified block diagram of several sample aspects of components that may be employed in communication nodes in conjunction with configuring identifiers.

FIG. 3 illustrates several sample components that may be incorporated into nodes such as the network management node 110 and the access point 102 to perform identifier configuration operations as taught herein. The components shown in FIG. 3 also may be incorporated into other nodes (e.g., network nodes or access points) in a communication system. For example, other network nodes in a system may include components similar to those described for the network management node 110 to provide similar functionality. In addition, other access points in a system (e.g., access point 104) may include components similar to those described for the access point 102 to provide similar functionality. A given node may contain one or more of the described components. For example, a client may contain multiple transceiver components that enable the client to operate on multiple frequencies and/or communicate via different technologies.

As shown in FIG. 3, the network management node 110 and the access point 102 may include transceivers 302 and 304, respectively, for communicating with other nodes. The transceiver 302 includes a transmitter 306 for sending signals (e.g., identifier configuration-related messages) and a receiver 308 for receiving signals. Similarly, the transceiver 304 includes a transmitter 310 for sending signals and a receiver 312 for receiving signals.

Depending on the connectivity of the nodes of FIG. 3, the transceiver 302 and/or the transceiver 304 may support different communication technologies. For example, a transceiver may enable communication via a wired link and/or a wireless link.

In some cases, the network management node 110 may support wired communication technology to communicate (e.g., for backhaul communication) with a stationary access point (e.g., access point 104). In these cases, transceivers at each of these nodes may support communication over a wired link.

As mentioned above, a mobile access point (e.g., access point 102) may comprise a wireless transceiver for backhaul communication with one or more nodes via a wireless link. In some cases the network management node 110 may include wireless communication technology to communicate (e.g., backhaul communication) with a mobile access point. In such a case, the network management node 110 may comprise a wireless transceiver and associated antenna. Alternatively, the network management node 110 may communicate via a wired link with another node (e.g., an access point) that, in turn, communicates with the mobile access point via a wireless link.

The network management node 110 and the access point 102 also include other components that may be used in conjunction with identifier configuration operations as taught herein. For example, the network management node 110 and the access point 102 may include communication controllers 314 and 316, respectively, for managing communication with other nodes (e.g., sending and receiving identifier configuration-related information) and for providing other related functionality as taught herein. In addition, the network management node 110 and the access point 102 may include identifier managers 112 and 114, respectively, as discussed herein for managing (e.g., defining and updating) access point identifiers and for providing other related functionality as taught herein. Operations relating to functional blocks 318-324 are described below. For convenience, the identifier manager 114 is not shown as including the functional blocks 318-324. However, as noted above, in some implementations one or more of the operations of these blocks may be performed by an access point.

Figure 2:
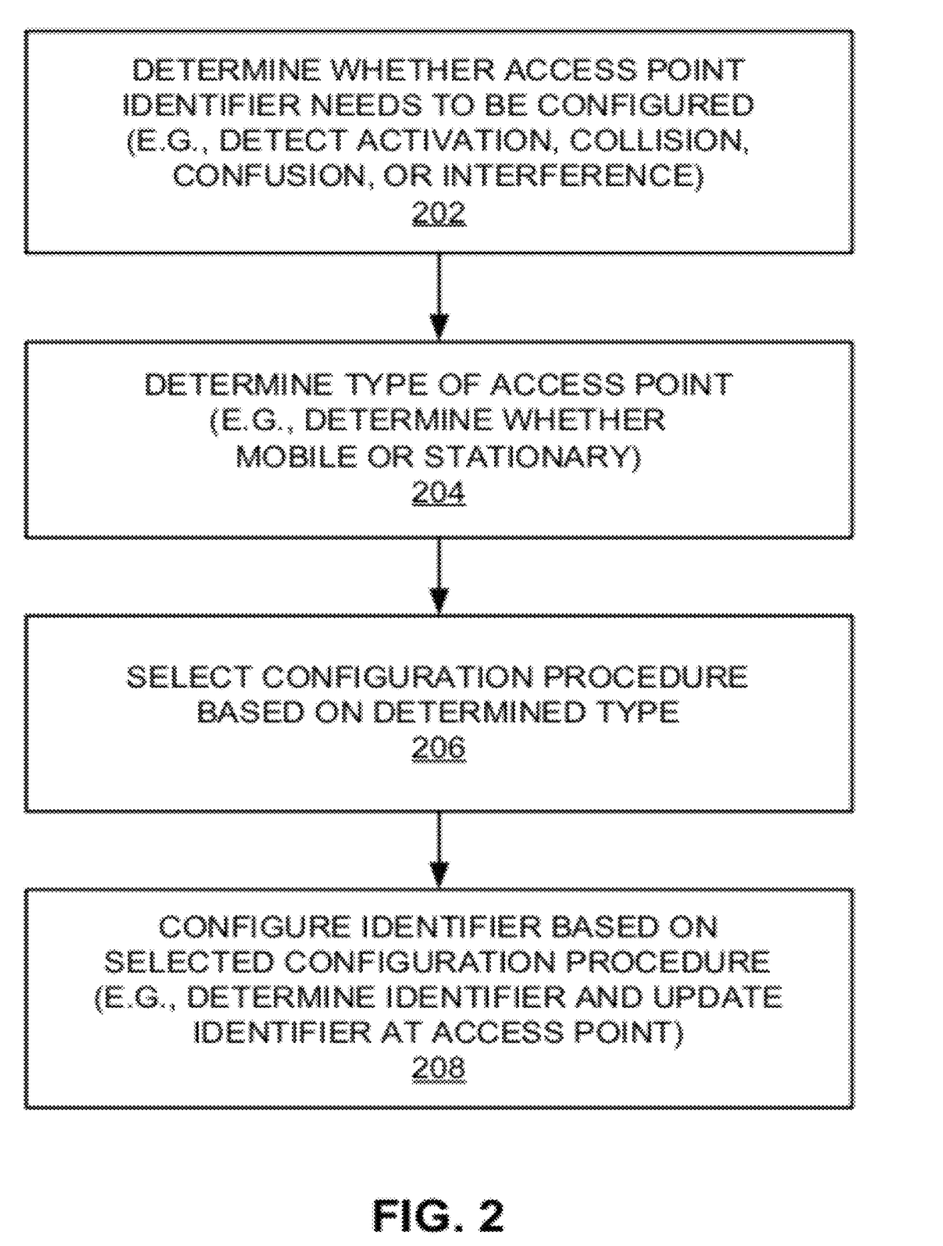
FIG. 2 is a flowchart of several sample aspects of operations that may be performed in conjunction with using different procedures for configuring identifiers of different types of access points.

Referring now to FIG. 2, as represented by block 202, at some point in time a determination is made regarding whether the access point identifier for a given access point needs to be configured. For example, an initial identifier may be assigned to the access point upon detecting that the access point has been activated (e.g., the access point has come on-line). In addition, the identifier assigned to the access point may be updated if it is determined that the identifier currently assigned to the access point may be subject to collision or confusion (e.g., another access point in the vicinity is or is likely to be using the same identifier). Also, the identifier assigned to the access point may be updated if interference associated with the broadcast of the identifier (e.g., pilot interference) is detected (e.g., interference resulting from two nearby access points broadcasting similar identifiers).

Configuration triggers such as those described above may be detected in various ways. In come cases a trigger may be detected via backhaul communication (e.g., by receiving information from neighboring access points regarding: the identifiers that are being used or may be used; detection of collisions; detection of confusion; detection of interference; and so on). In some cases a trigger may be detected based on communication received from one or more access terminal (e.g., identifiers, interference, or confusion seen by an access terminal). In some cases a trigger may be detected based on wireless signals (e.g., pilots) received by the node that is making the determination at block 202. In some cases a trigger may be based on timing (e.g., certain identifiers are configured at certain times). In some cases a trigger may be based on the location of one or more access points. For example, identifiers may be reconfigured if an access point or access points are detected at certain locations (e.g., a geographic location or a relative distance to another entity). Here, the location information may be tied to timing information (e.g., an access point is detected at a certain location at a certain time).

As mentioned above, the operations of block 202 may be performed by various nodes (e.g., independently or in cooperation). For example, in some cases the node 110 (e.g., the identifier manager 112) may determine whether the identifiers used by the access points 102 and 104 are to be configured. In some cases the identifier manager at each access point may determine whether its respective identifier needs to be configured.

As represented by block 204 of FIG. 2, in the event an identifier for an access point is to be configured, the type of the access point is determined (e.g., by operation of an access point type determiner 318 of an identifier manager as shown in FIG. 3). Here, the type may indicate, for example, whether the access point is a mobile access point, a stationary access point, or some other type of access point. As above, the operations of block 204 may be performed by various nodes in a system (e.g., network nodes and/or access points). For example, a network node may determine the type of a given access point or the access point may determine its type and generate an indication of this determination (e.g., send the indication to a network node).

As represented by block 206, an access point identifier configuration procedure is selected (e.g., by operation of a configuration procedure selector 320 of an identifier manager) based on the determined access point type. As described in more detail below in conjunction with FIG. 4, selecting a procedure may relate to, for example, selecting at least one of several different identifier spaces (defined for different types of access points) to be used for configuring an access point of a given type. As described in more detail below in conjunction with FIG. 5, selecting a procedure may relate to, for example, selecting one timing from several different timings (associated with different access points) for configuring an access point of a given type. As described in more detail below in conjunction with FIG. 6, selecting a procedure may relate to, for example, determining which algorithm of several different algorithms (associated with different types of access points) is to be used to generate an identifier for an access point of a given type. As above, the operations of block 206 may be performed by various nodes in a system (e.g., network nodes and/or access points).

As represented by block 208, the access point is then configured (e.g., by operation of an identifier configuration controller 322 of an identifier manager) with an identifier based on the configuration procedure selected at block 206. As discussed in more detail below, in some aspects this may involve one or more of, for example, determining (e.g., selecting, generating, etc.) the identifier to be assigned to the access point, updating the identifier at the access point, or performing the configuration at a particular time. In addition, in some cases (e.g., when the identifier is determined by a network node), the operations of block 208 also involve sending the determined identifier to the access point.

As mentioned above, various types of configuration procedures may be used in accordance with the teachings herein. Several sample procedures will be described in more detail with reference to FIGS. 4-6.

Figure 4:
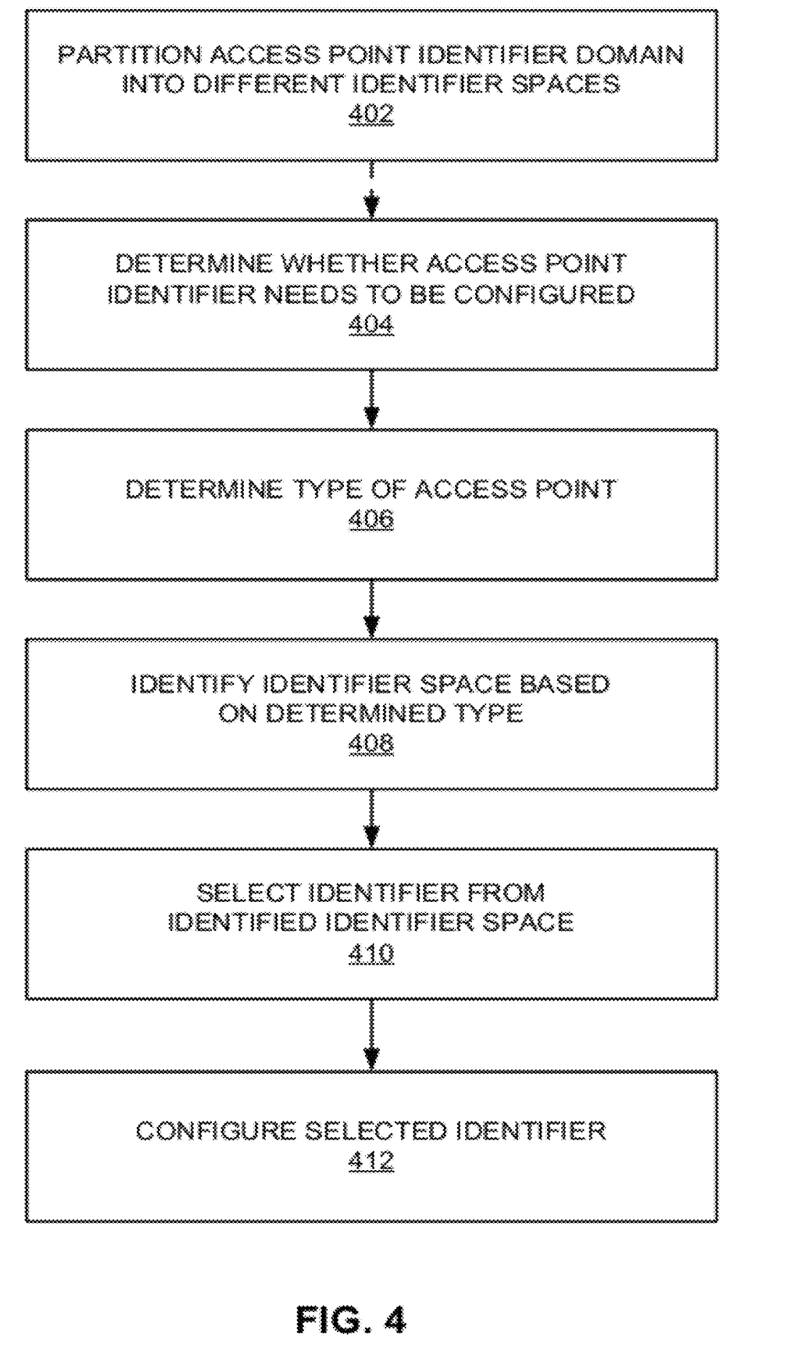
FIG. 4 is a flowchart of several sample aspects of operations that may be performed in conjunction with using different identifier spaces for different types of access points.

FIG. 4 relates to an access point identifier configuration procedure that uses different identifier spaces for different types of access points. Here, an access point identifier domain may be defined for a system (e.g., a set of 504 identifiers that are available for use by access points in the system). As represented by block 402, the identifier domain is partitioned (e.g., segmented) into different identifier spaces (e.g., which may be mutually exclusive or which may partially overlap). For example, one identifier space (e.g., comprising 10 or 50 identifiers) may be allocated for one type of access point (e.g., mobile access points) while another identifier space (e.g., comprising the remaining identifiers of the domain) may be allocated for another type of access point (e.g., stationary access points). In some cases more than one identifier space may be allocated for an access point type. In this way, different access points of the same type may be assigned identifiers from different identifier spaces to reduce the possibility of collisions between these access points.

The definition and partitioning of the domain may be achieved in various ways. In some cases these parameters may be statically defined for a network (e.g., by a network operator). In some cases the parameters may be dynamically defined. For example, a node in the system (e.g., an identifier space definer 324 of the node 110) may partition the domain based on conditions in the network (e.g., a detected or anticipated increase or decrease in collisions, interference, etc.). As a specific example, if a large number of collisions are occurring between mobile access points, but relatively few (or no) collisions are occurring between mobile and stationary access points, the size of the identifier space allocated to mobile access points may be increased. In some aspects, an identifier space for mobile access points may be dimensioned such that collision probability is lower as compared to stationary access points (e.g., because mobile access points may have a higher likelihood of encountering a conflicting mobile access point).

As represented by block 404 of FIG. 4, at some point in time a determination may be made that an access point needs to be configured. In this case, the type of the access point may be determined (block 406). The operations of blocks 404 and 406 may thus correspond to the operations of blocks 202 and 204 discussed above.

As represented by block 408, an identifier space is identified based on the determined type. For example, if the access point to be configured is a mobile access point, at least one identifier space allocated to mobile access points may be identified here.

As represented by block 410, an identifier is then selected from the identified identifier space. Here, provisions may be taken to reduce the possibility that the selected identifier will be subject to confusion. For example, if possible, an identifier that is not being used by any other access points will be selected. In some cases expected locations of mobile access points may be taken into account here (e.g., if the mobile access point is located on a vehicle with a known or expected route). In addition, in some cases the times at which the mobile access point is expected to be operating at certain locations may be taken into account. In this way, a determination may be made as to whether access points (e.g., mobile and/or stationary access points) will be operating in the vicinity of one another at the same time.

In some aspects the selection of the identifier may be based on another criterion or other criteria as taught herein. For example, the identifier obtained at block 410 may be generated using an algorithm that is selected as described in FIG. 6.

As represented by block 412, the access point is then configured with the identifier selected at block 410. In some aspects the operations of block 412 may correspond to the operations of block 208 discussed above. Also, configuring the identifier may be based on another criterion or other criteria as taught herein. For example, the time at which the access point is configured may be based on timing that is determined as described in FIG. 5.

Figure 5:
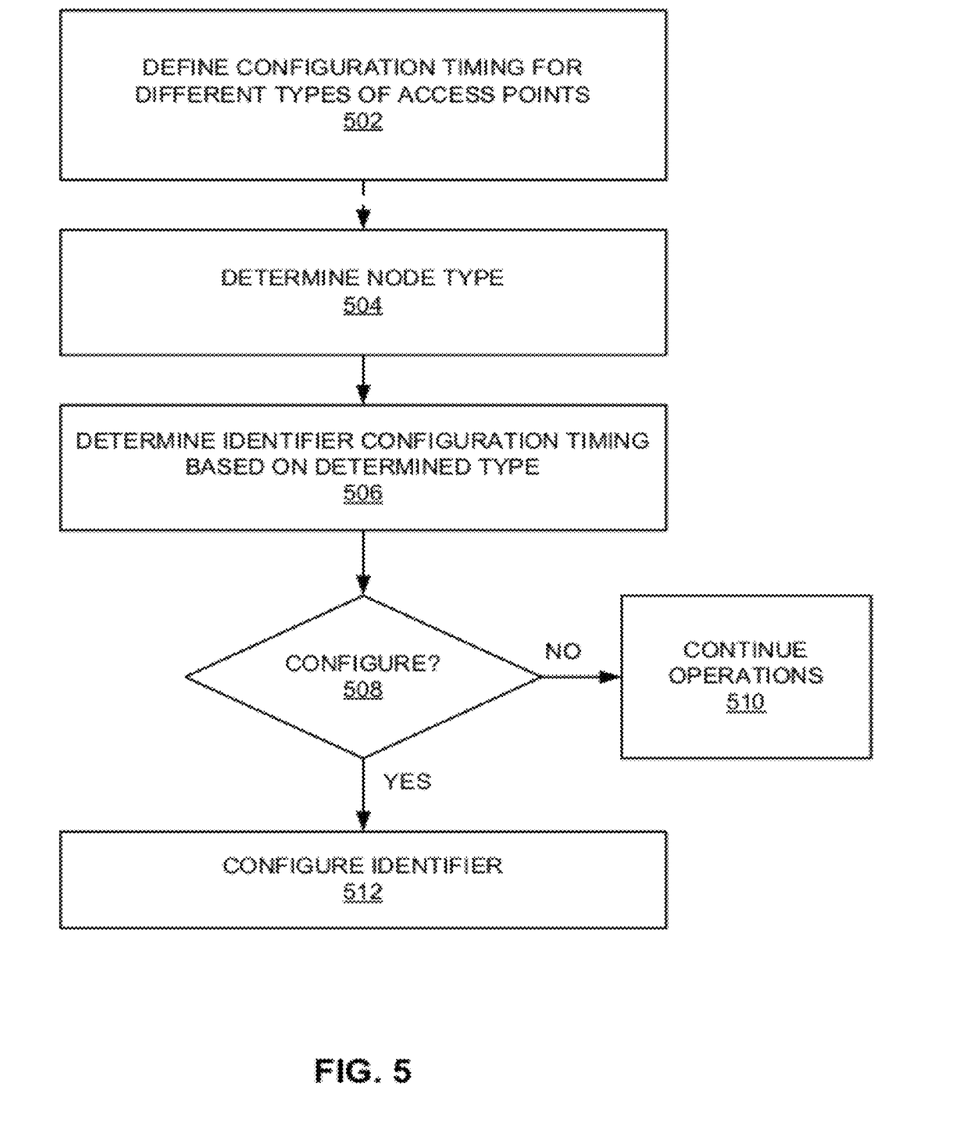
FIG. 5 is a flowchart of several sample aspects of operations that may be performed where the timing for configuring an identifier depends on the type of access point.

FIG. 5 relates to an access point identifier configuration procedure that configures different types of access points at different times. As represented by block 502, different configuration timing may be defined for different types of nodes in the system. For example, one timing (e.g., a faster update frequency) may be allocated for one type of access point (e.g., mobile access points) while another timing (e.g., a slower update frequency) may be allocated for another type of access point (e.g., stationary access points). As another example, the manager 116 (FIG. 1) of the stationary access point 104 may be planned to update so that collisions are avoided over a large time scale, while the manager 114 (FIG. 1) of the mobile access point 102 may update more dynamically to account for increased risk of collision due to cell mobility. In some cases more than one timing may be allocated for an access point type. In this way, different access points of the same type may be configured with identifiers at different times to reduce the possibility of collisions between these access points.

The definition of identifier configuration timing may be achieved in various ways. In some cases the timing parameters may be statically defined for a network (e.g., by a network operator). In some cases the timing parameters may be dynamically defined. For example, a node in the system (e.g., the node 110) may define timing based on conditions in the network (e.g., a detected or anticipated increase or decrease in collisions, interference, etc.). As a specific example, if a large number of collisions are occurring for certain mobile access points, the frequency with which these mobile access points are configured may be increased.

As represented by blocks 504-508, a process may be run (e.g., at network node 110) that determines when to configure an access point. In some implementations these operations may be based on interrupt-driven timing. At block 504, the type of the access point may be determined. The operations of block 504 may thus correspond to the operations of blocks 204 discussed above.

At block 506, the identifier configuration timing is determined for the access point type determined at block 504. In some cases the access point may be configured according to a schedule. As a specific example, access points of a certain type may be reconfigured at certain times (e.g., when these access points are known or likely to be in the vicinity of certain of nodes). Conversely, access points of another type (e.g., stationary access points) may only be configured if there has been a reconfiguration of the network or if the access point has been powered on.

As represented by blocks 508 and 510, if the access point does not need to be configured, normal operations may continue. For example, the node 110 may continue to perform its standard operations until the next time the node 110 is to determine whether to configure one or more access points.

Conversely, as represented by block 512, the access point is configured if this is indicated by the timing determined at block 506. In some aspects the operations of block 512 may correspond to the operations of block 208 discussed above (e.g., determining the identifier, updating the identifier at the access point, etc.).

Figure 6:
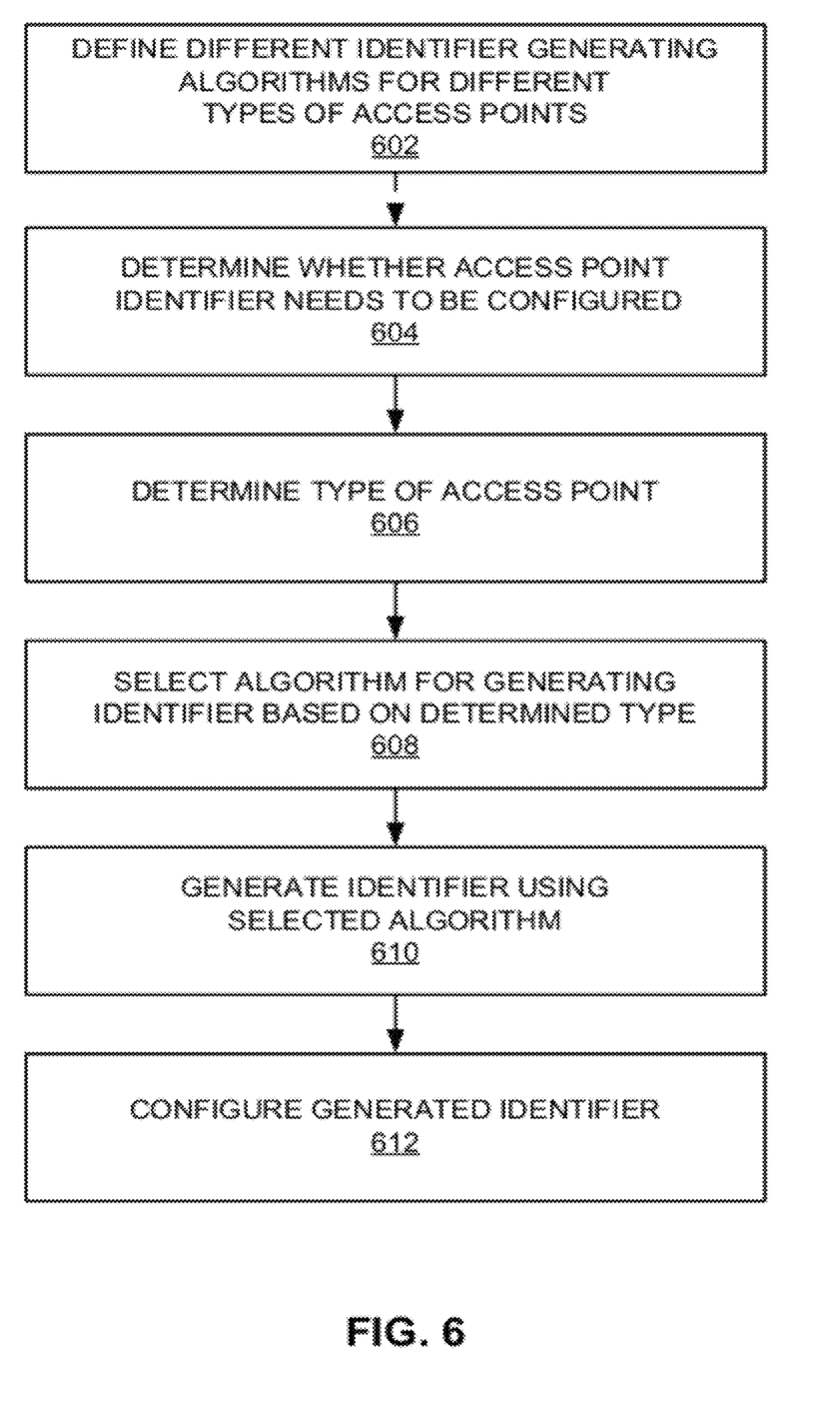
FIG. 6 is a flowchart of several sample aspects of operations that may be performed where different algorithms are used to generate identifiers for different types of access points.

FIG. 6 relates to an access point identifier configuration procedure that uses different algorithms to generate the identifiers for different types of access points. In some implementations, such an algorithm may generate an identifier (e.g., PCID) for an access point based on a unique identifier (e.g., global cell identifier, GCI) of the access point. As represented by block 602, different algorithms (e.g., hash algorithms) may be defined for different types of nodes in the system. For example, one algorithm (e.g., which may map a given unique identifier to one identifier) may be allocated for one type of access point (e.g., mobile access points) while another algorithm (e.g., which may map the given unique identifier to a different identifier) may be allocated for another type of access point (e.g., stationary access points). In this way, different identifiers may be generated for different types of access points. In some aspects the different algorithms may map the generated identifiers into different identifier spaces (e.g., as in FIG. 4). In some cases more than one algorithm may be allocated for an access point type. In this way, different access points of the same type may be configured with identifiers generated by a different algorithm.

As represented by block 604, at some point in time a determination may be made that an access point needs to be configured. In this case, the type of the access point may be determined (block 606). The operations of blocks 604 and 606 may thus correspond to the operations of blocks 202 and 204 discussed above.

As represented by block 608, an algorithm is selected for generating the identifier based on the determined type. The algorithm is then executed to generate the identifier as represented by block 610.

As represented by block 612, the access point is configured with the identifier generated at block 610. In some aspects the operations of block 612 may correspond to the operations of block 208 discussed above.

In some aspects the teachings herein may be employed in a wireless multiple-access communication system that simultaneously supports communication for multiple wireless access terminals (e.g., clients). Here, each terminal may communicate with one or more access points via transmissions on the forward and reverse links. The forward link (or downlink) refers to the communication link from the access points to the terminals, and the reverse link (or uplink) refers to the communication link from the terminals to the access points.

Figure 7:
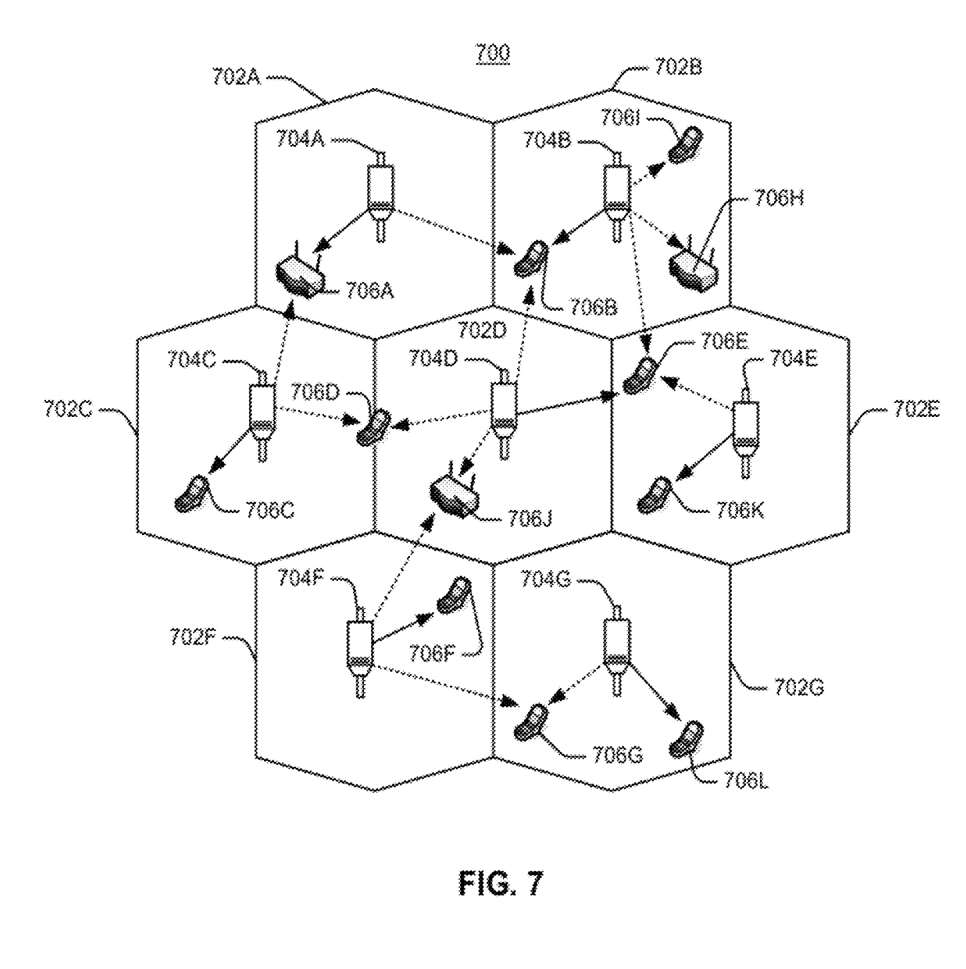
FIG. 7 is a simplified diagram of a sample wireless communication system.

FIG. 7 illustrates a wireless communication system 700, configured to support a number of users, in which the teachings herein may be implemented. The system 700 provides communication for multiple cells 702, such as, for example, macro cells 702A-702G, with each cell being serviced by a corresponding access point 704 (e.g., access points 704A-704G). As shown in FIG. 7, access terminals 706 (e.g., access terminals 706A-706L) may be dispersed at various locations throughout the system over time. Each access terminal 706 may communicate with one or more access points 704 on a forward link ("FL") and/or a reverse link ("RL") at a given moment, depending upon whether the access terminal 706 is active and whether it is in soft handoff, for example. The wireless communication system 700 may provide service over a large geographic region. For example, macro cells 702A-702G may cover a few blocks in a neighborhood or several miles in rural environment.

These communication links may be established via a single-in-single-out system, a multiple-in-multiple-out ("MIMO") system, or some other type of system. A MIMO system employs multiple ($N_T$) transmit antennas and multiple ($N_R$) receive antennas for data transmission. A MIMO channel formed by the $N_T$ transmit and $N_R$ receive antennas may be decomposed into $N_S$ independent channels, which are also referred to as spatial channels, where $N_S \leq \min\{N_T, N_R\}$. Each of the $N_S$ independent channels corresponds to a dimension. The MIMO system may provide improved performance (e.g., higher throughput and/or greater reliability) if the additional dimensionalities created by the multiple transmit and receive antennas are utilized.

A MIMO system may support time division duplex ("TDD") and frequency division duplex ("FDD"). In a TDD system, the forward and reverse link transmissions are on the same frequency region so that the reciprocity principle allows the estimation of the forward link channel from the reverse link channel. This enables the access point to extract transmit beam-forming gain on the forward link when multiple antennas are available at the access point.

Figure 8:
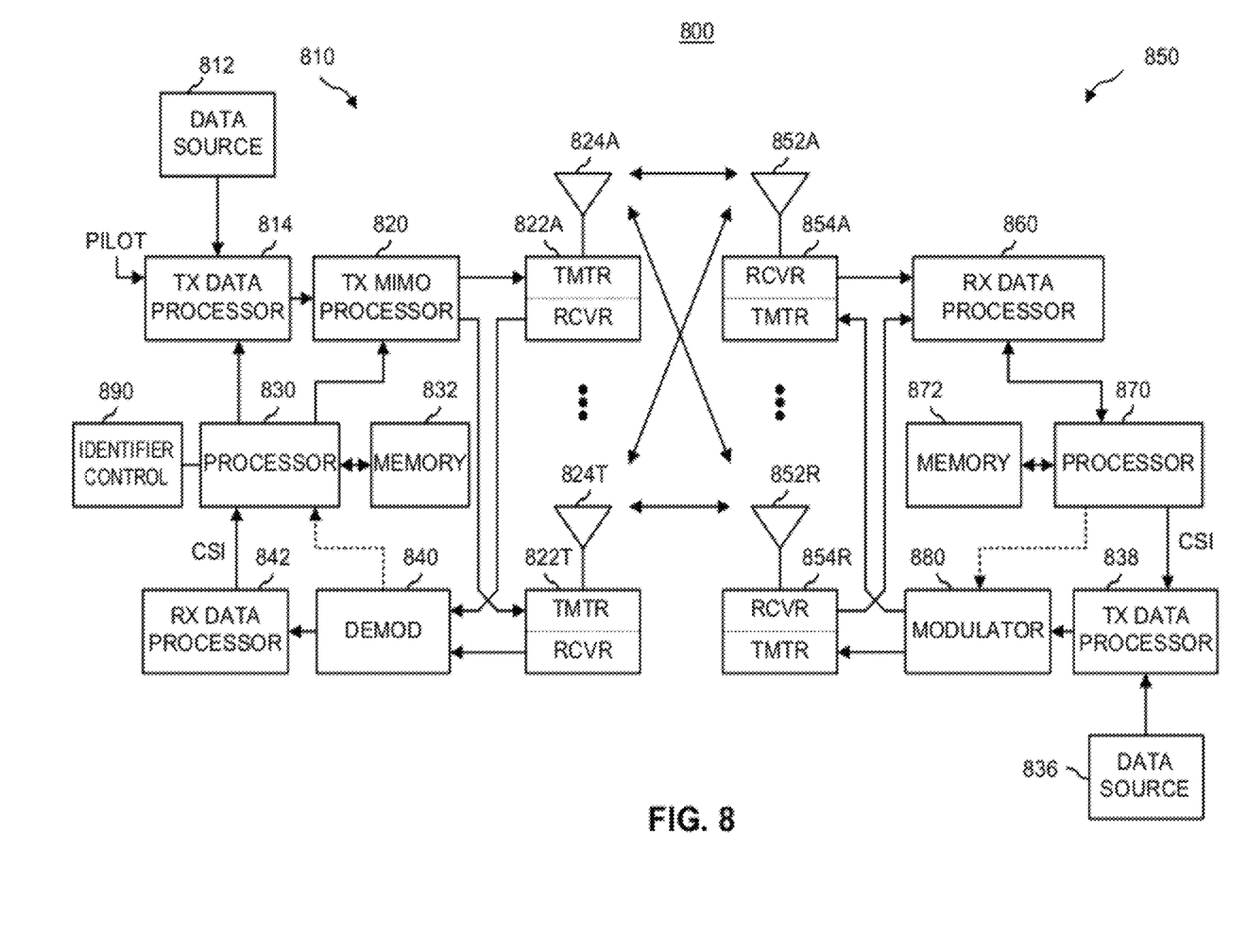
FIG. 8 is a simplified block diagram of several sample aspects of communication components.

The teachings herein may be incorporated into a node (e.g., a device) employing various components for communicating with at least one other node. FIG. 8 depicts several sample components that may be employed to facilitate communication between nodes. Specifically, FIG. 8 illustrates a wireless device 810 (e.g., an access point) and a wireless device 850 (e.g., an access terminal) of a MIMO system 800. At the device 810, traffic data for a number of data streams is provided from a data source 812 to a transmit ("TX") data processor 814.

In some aspects, each data stream is transmitted over a respective transmit antenna. The TX data processor 814 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QSPK, M-PSK, or M-QAM) selected for that data stream to provide modulation symbols. The data rate, coding, and modulation for each data stream may be determined by instructions performed by a processor 830. A data memory 832 may store program code, data, and other information used by the processor 830 or other components of the device 810.

The modulation symbols for all data streams are then provided to a TX MIMO processor 820, which may further process the modulation symbols (e.g., for OFDM). The TX MIMO processor 820 then provides $N_T$ modulation symbol streams to $N_T$ transceivers ("XCVR") 822A through 822T. In some aspects, the TX MIMO processor 820 applies beam-forming weights to the symbols of the data streams and to the antenna from which the symbol is being transmitted.

Each transceiver 822 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transceivers 822A through 822T are then transmitted from $N_T$ antennas 824A through 824T, respectively.

At the device 850, the transmitted modulated signals are received by $N_R$ antennas 852A through 852R and the received signal from each antenna 852 is provided to a respective transceiver ("XCVR") 854A through 854R. Each transceiver 854 conditions (e.g., filters, amplifies, and downconverts) a respective received signal, digitizes the conditioned signal to provide samples, and further processes the samples to provide a corresponding "received" symbol stream.

A receive ("RX") data processor 860 then receives and processes the $N_R$ received symbol streams from $N_R$ transceivers 854 based on a particular receiver processing technique to provide $N_T$ "detected" symbol streams. The RX data processor 860 then demodulates, deinterleaves, and decodes each detected symbol stream to recover the traffic data for the data stream. The processing by the RX data processor 860 is complementary to that performed by the TX MIMO processor 820 and the TX data processor 814 at the device 810.

A processor 870 periodically determines which pre-coding matrix to use (discussed below). The processor 870 formulates a reverse link message comprising a matrix index portion and a rank value portion. A data memory 872 may store program code, data, and other information used by the processor 870 or other components of the device 850.

The reverse link message may comprise various types of information regarding the communication link and/or the received data stream. The reverse link message is then processed by a TX data processor 838, which also receives traffic data for a number of data streams from a data source 836, modulated by a modulator 880, conditioned by the transceivers 854A through 854R, and transmitted back to the device 810.

At the device 810, the modulated signals from the device 850 are received by the antennas 824, conditioned by the transceivers 822, demodulated by a demodulator ("DE-MOD") 840, and processed by a RX data processor 842 to extract the reverse link message transmitted by the device 850. The processor 830 then determines which pre-coding matrix to use for determining the beam-forming weights then processes the extracted message.

FIG. 8 also illustrates that the communication components may include one or more components that perform identifier configuration control operations as taught herein. For example, an identifier control component 890 may cooperate with the processor 830 and/or other components of the device 810 to receive configuration information from one device (e.g., an OAM that facilitates management and control of access points in a wireless communication network) and/or provide such information and then broadcast the identifier to another device (e.g., the device 850). It should be appreciated that for each device 810 and 850 the functionality of two or more of the described components may be provided by a single component. For example, a single processing component may provide the functionality of the identifier control component 890 and the processor 830.

The teachings herein may be incorporated into various types of communication systems and/or system components. In some aspects, the teachings herein may be employed in a multiple-access system capable of supporting communication with multiple users by sharing the available system resources (e.g., by specifying one or more of bandwidth, transmit power, coding, interleaving, and so on). For example, the teachings herein may be applied to any one or combinations of the following technologies: Code Division Multiple Access ("CDMA") systems, Multiple-Carrier CDMA ("MCCDMA"), Wideband CDMA ("W-CDMA"), High-Speed Packet Access ("HSPA," "HSPA+") systems, Time Division Multiple Access ("TDMA") systems, Frequency Division Multiple Access ("FDMA") systems, Single-Carrier FDMA ("SC-FDMA") systems, Orthogonal Frequency Division Multiple Access ("OFDMA") systems, or other multiple access techniques. A wireless communication system employing the teachings herein may be designed to implement one or more standards, such as IS-95, cdma2000, IS-856, W-CDMA, TDSCDMA, and other standards. A CDMA network may implement a radio technology such as Universal Terrestrial Radio Access ("UTRA)", cdma2000, or some other technology. UTRA includes W-CDMA and Low Chip Rate ("LCR"). The cdma2000 technology covers IS-2000, IS-95 and IS-856 standards. A TDMA network may implement a radio technology such as Global System for Mobile Communications ("GSM"). An OFDMA network may implement a radio technology such as Evolved UTRA ("E-UTRA"), IEEE 802.11, IEEE 802.16, IEEE 802.20, Flash-OFDM®, etc. UTRA, E-UTRA, and GSM are part of Universal Mobile Telecommunication System ("UMTS"). The teachings herein may be implemented in a 3GPP Long Term Evolution ("LTE") system, an Ultra-Mobile Broadband ("UMB") system, and other types of systems. LTE is a release of UMTS that uses E-UTRA. Although certain aspects of the disclosure may be described using 3GPP terminology, it is to be understood that the teachings herein may be applied to 3GPP (Re199, Re15, Re16, Re17) technology, as well as 3GPP2 (IxRTT, 1xEV-DO Re1O, RevA, RevB) technology and other technologies.

In some aspects the teachings herein may be employed in a network that includes macro scale coverage (e.g., a large area cellular network such as a 3G network, typically referred to as a macro cell network or a WAN) and smaller scale coverage (e.g., a residence-based or building-based network environment, typically referred to as a LAN). As an access terminal ("AT") moves through such a network, the access terminal may be served in certain locations by access points that provide macro coverage while the access terminal may be served at other locations by access points that provide smaller scale coverage. In some aspects, the smaller coverage nodes may be used to provide incremental capacity growth, in-building coverage, and different services (e.g., for a more robust user experience).

A node (e.g., an access point) that provides coverage over a relatively large area may be referred to as a macro node while a node that provides coverage over a relatively small area (e.g., a residence) may be referred to as a femto node. It should be appreciated that the teachings herein may be applicable to nodes associated with other types of coverage areas. For example, a pico node may provide coverage (e.g., coverage within a commercial building) over an area that is smaller than a macro area and larger than a femto area. In various applications, other terminology may be used to reference a macro node, a femto node, or other access point-type nodes. For example, a macro node may be configured or referred to as an access node, base station, access point, eNodeB, macro cell, and so on. Also, a femto node may be configured or referred to as a Home NodeB, Home eNodeB, access point base station, femto cell, and so on. In some implementations, a node may be associated with (e.g., divided into) one or more cells or sectors. A cell or sector associated with a macro node, a femto node, or a pico node may be referred to as a macro cell, a femto cell, or a pico cell, respectively.

The teachings herein may be incorporated into (e.g., implemented within or performed by) a variety of apparatuses (e.g., nodes). In some aspects, a node (e.g., a wireless node) implemented in accordance with the teachings herein may comprise an access point or an access terminal.

For example, an access terminal may comprise, be implemented as, or known as user equipment, a subscriber station, a subscriber unit, a mobile station, a mobile, a mobile node, a remote station, a remote terminal, a user terminal, a user agent, a user device, or some other terminology. In some implementations an access terminal may comprise a cellular telephone, a cordless telephone, a session initiation protocol ("SIP") phone, a wireless local loop ("WLL") station, a personal digital assistant ("PDA"), a handheld device having wireless connection capability, or some other suitable processing device connected to a wireless modem. Accordingly, one or more aspects taught herein may be incorporated into a phone (e.g., a cellular phone or smart phone), a computer (e.g., a laptop), a portable communication device, a portable computing device (e.g., a personal data assistant), an entertainment device (e.g., a music device, a video device, or a satellite radio), a global positioning system device, or any other suitable device that is configured to communicate via a wireless medium.

An access point may comprise, be implemented as, or known as a NodeB, an eNodeB, a radio network controller ("RNC"), a base station ("BS"), a radio base station ("RBS"), a base station controller ("BSC"), a base transceiver station ("BTS"), a transceiver function ("TF"), a radio transceiver, a radio router, a basic service set ("BSS"), an extended service set ("ESS"), a macro cell, a macro node, a Home eNB ("HeNB"), a femto cell, a femto node, a pico node, or some other similar terminology.

In some aspects a node (e.g., an access point) may comprise an access node for a communication system. Such an access node may provide, for example, connectivity for or to a network (e.g., a wide area network such as the Internet or a cellular network) via a wired or wireless communication link to the network. Accordingly, an access node may enable another node (e.g., an access terminal) to access a network or some other functionality. In addition, it should be appreciated that one or both of the nodes may be portable or, in some cases, relatively non-portable.

Also, it should be appreciated that a wireless node may be capable of transmitting and/or receiving information in a non-wireless manner (e.g., via a wired connection). Thus, a receiver and a transmitter as discussed herein may include appropriate communication interface components (e.g., electrical or optical interface components) to communicate via a non-wireless medium.

A wireless node may communicate via one or more wireless communication links that are based on or otherwise support any suitable wireless communication technology. For example, in some aspects a wireless node may associate with a network. In some aspects the network may comprise a local area network or a wide area network. A wireless device may support or otherwise use one or more of a variety of wireless communication technologies, protocols, or standards such as those discussed herein (e.g., CDMA, TDMA, OFDM, OFDMA, WiMAX, Wi-Fi, and so on). Similarly, a wireless node may support or otherwise use one or more of a variety of corresponding modulation or multiplexing schemes. A wireless node may thus include appropriate components (e.g., air interfaces) to establish and communicate via one or more wireless communication links using the above or other wireless communication technologies. For example, a wireless node may comprise a wireless transceiver with associated transmitter and receiver components that may include various components (e.g., signal generators and signal processors) that facilitate communication over a wireless medium.

Figure 9:
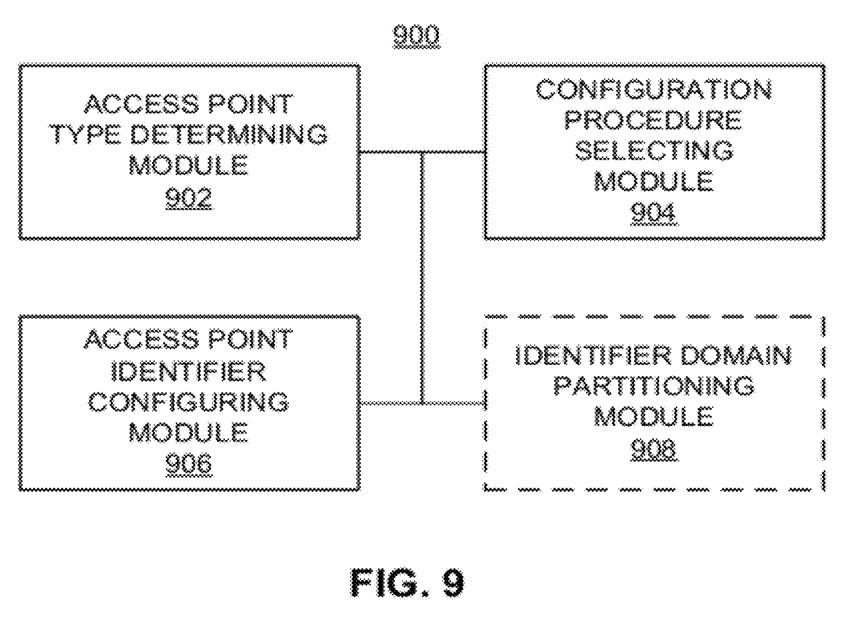
FIG. 9 is simplified block diagram of several sample aspects of an apparatus configured to configure an access point identifier as taught herein.

The functionality described herein (e.g., with regard to one or more of the accompanying figures) may correspond in some aspects to similarly designated "means for" functionality in the appended claims. Referring to FIG. 9, apparatus 900 is represented as a series of interrelated functional modules. Here, an access point type determining module 902 may correspond at least in some aspects to, for example, an access point type determiner as discussed herein. A configuration procedure selecting module 904 may correspond at least in some aspects to, for example, a configuration procedure selector as discussed herein. An access point identifier configuring module 906 may correspond at least in some aspects to, for example, an identifier configuration controller as discussed herein. An identifier domain partitioning module 908 may correspond at least in some aspects to, for example, an identifier space definer as discussed herein.

The functionality of the modules of FIG. 9 may be implemented in various ways consistent with the teachings herein. In some aspects the functionality of these modules may be implemented as one or more electrical components. In some aspects the functionality of these blocks may be implemented as a processing system including one or more processor components. In some aspects the functionality of these modules may be implemented using, for example, at least a portion of one or more integrated circuits (e.g., an ASIC). As discussed herein, an integrated circuit may include a processor, software, other related components, or some combination thereof. The functionality of these modules also may be implemented in some other manner as taught herein. In some aspects one or more of any dashed blocks in FIG. 9 are optional.

It should be understood that any reference to an element herein using a designation such as "first," "second," and so forth does not generally limit the quantity or order of those elements. Rather, these designations may be used herein as a convenient method of distinguishing between two or more elements or instances of an element. Thus, a reference to first and second elements does not mean that only two elements may be employed there or that the first element must precede the second element in some manner. Also, unless stated otherwise a set of elements may comprise one or more elements. In addition, terminology of the form "at least one of: A, B, or C" used in the description or the claims means "A or B or C or any combination of these elements."

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that any of the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented within or performed by an integrated circuit ("IC"), an access terminal, or an access point. The IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media. It should be appreciated that a computer-readable medium may be implemented in any suitable computer-program product.

The previous description of the disclosed aspects is provided to enable any person skilled in the art to make or use the present disclosure. Various modifications to these aspects will be readily apparent to those skilled in the art, and the generic principles defined herein may be applied to other aspects without departing from the scope of the disclosure. Thus, the present disclosure is not intended to be limited to the aspects shown herein but is to be accorded the widest scope consistent with the principles and novel features disclosed herein.

What is claimed is:

1. An identifier management method, comprising:
   determining a type of an access point, wherein the type indicates whether the access point is a mobile access point;
   selecting, according to the determined type of the access point, an access point identifier space from an access point identifier domain that is partitioned into a plurality of access point identifier spaces, in which at least one of the plurality of access point identifier spaces is allocated for mobile access points and at least another one of the plurality of access point identifier spaces is allocated for stationary access points;
   selecting an access point identifier configuration procedure based on the determined type of the access point; and configuring an access point identifier for the access point based on the selected access point identifier space and the selected access point identifier configuration procedure using a computer.

2. The method of claim 1, wherein the configuring comprises determining the access point identifier for the access point from the selected access point identifier space based on the selected access point identifier configuration procedure.

3. The method of claim 1, wherein the configuring further comprises sending the access point identifier to the access point.

4. The method of claim 1, wherein the plurality of access point identifier spaces are mutually exclusive.

5. The method of claim 1, wherein the configuring comprises:
   selecting the access point identifier for the access point from the selected access point identifier space; and
   configuring the access point with the access point identifier.

6. The method of claim 1, further comprising partitioning the access point identifier domain into the plurality of access point identifier spaces to mitigate access point identifier collision between mobile access points and stationary access points.

7. The method of claim 1, wherein the selecting the access point identifier configuration procedure comprises determining a timing for configuring the access point identifier for the access point based on the determined type of the access point.

8. The method of claim 7, wherein the configuring comprises configuring the access point with the access point identifier at a time that is based on the timing.

9. The method of claim 1, wherein the selecting the access point identifier configuration procedure comprises selecting an algorithm for generating the access point identifier for the access point based on the determined type of the access point.

10. The method of claim 9, wherein the algorithm comprises a hash algorithm.

11. The method of claim 9, wherein the configuring comprises:
    generating the access point identifier for the access point using the algorithm; and
    configuring the access point with the access point identifier.

12. The method of claim 1, wherein the access point identifier for the access point comprises a physical cell identifier.

13. A network management node, comprising:
    a memory containing instructions; and
    at least one processor coupled to the memory, the at least one processor, when executing the instructions, is configured:
    to determine a type of an access point, wherein the type indicates whether the access point is a mobile access point;
    to select, according to the determined type of the access point, an access point identifier space from an access point identifier domain that is partitioned into a plurality of access point identifier spaces, in which at least one of the plurality of access point identifier spaces is allocated for mobile access points and at least another one of the plurality of access point identifier spaces is allocated for stationary access points;
    to select an access point identifier configuration procedure based on the determined type of the access point; and
    to configure an access point identifier for the access point based on the selected access point identifier space and the selected access point identifier configuration procedure.

14. An access point, comprising:
    a memory containing instructions; and
    at least one processor coupled to the memory, the at least one processor, when executing the instructions, is configured:
    to determine a type of the access point, wherein the type indicates whether the access point is a mobile access point;
    to select, according to the determined type of the access point, an access point identifier space from an access point identifier domain that is partitioned into a plurality of access point identifier spaces, in which at least one of the plurality of access point identifier spaces is allocated for mobile access points and at least another one of the plurality of access point identifier spaces is allocated for stationary access points;
    to select an access point identifier configuration procedure based on the determined type of the access point; and
    to configure an access point identifier for the access point based on the selected access point identifier space and the selected access point identifier configuration procedure.

15. An identifier management apparatus, comprising:
    an access point type component configured to determine a type of an access point, wherein the type indicates whether the access point is a mobile access point;
    an identifier space component configured to select, according to the determined type of the access point, an access point identifier space from an access point identifier domain that is partitioned into a plurality of access point identifier spaces, in which at least one of the plurality of access point identifier spaces is allocated for mobile access points and at least another one of the of the plurality of access point identifier spaces is allocated for stationary access points;
    a configuration procedure component configured to select an access point identifier configuration procedure based on the determined type of the access point; and
    an identifier configuration controller configured to configure an access point identifier for the access point based on the selected access point identifier space and the selected access point identifier configuration procedure.

16. The apparatus of claim 15, wherein the identifier configuration controller is further configured to determine the access point identifier for the access point from the selected access point identifier space based on the selected access point identifier configuration procedure.

17. The apparatus of claim 16, wherein the identifier configuration controller is further configured to send the access point identifier to the access point.

18. The apparatus of claim 15, wherein the plurality of access point identifier spaces are mutually exclusive.

19. The apparatus of claim 15, wherein the identifier configuration controller is further configured:
    to select the access point identifier for the access point from the selected access point identifier space; and
    to configure the access point with the access point identifier.

20. The apparatus of claim 15, the identifier space definer component is further configured to partition the access point identifier domain into the plurality of access point identifier spaces to mitigate access point identifier collision between mobile access points and stationary access points.

21. The apparatus of claim 15, wherein the configuration procedure component is further configured to determine a timing for configuring the access point identifier for the access point based on the determined type of the access point.

22. The apparatus of claim 21, wherein the configuration procedure component is further configured to configure the access point with the access point identifier at a time that is based on the timing.

23. The apparatus of claim 15, wherein the configuration procedure component is further configured to select an algorithm for generating the access point identifier for the access point based on the determined type of the access point.

24. The apparatus of claim 23, wherein the identifier configuration controller is further configured:
to generate the access point identifier for the access point using the algorithm; and
to configure the access point with the access point identifier.

25. An identifier management apparatus, comprising:
means for determining a type of an access point, wherein the type indicates whether the access point is a mobile access point;
means for selecting, according to the determined type of the access point, an access point identifier space from an access point identifier domain that is partitioned into a plurality of access point identifier spaces, in which at least one of the plurality of access point identifier spaces is allocated for mobile access points and at least another one of the of the plurality of access point identifier spaces is allocated for stationary access points;
means for selecting an access point identifier configuration procedure based on the determined type of the access point; and
means for configuring an access point identifier for the access point based on the selected access point identifier space and the selected access point identifier configuration procedure.

26. The apparatus of claim 25, wherein the configuring comprises determining the access point identifier for the access point from the selected access point identifier space based on the selected access point identifier configuration procedure.

27. The apparatus of claim 26, wherein the configuring further comprises sending the access point identifier to the access point.

28. The apparatus of claim 25, wherein the plurality of access point identifier spaces are mutually exclusive.

29. The apparatus of claim 25, wherein the configuring comprises:
selecting the access point identifier for the access point from the selected access point identifier space; and
configuring the access point with the access point identifier.

30. The apparatus of claim 25, further comprising means for partitioning the access point identifier domain into the plurality of access point identifier spaces to mitigate access point identifier collision between mobile access points and stationary access points.

31. The apparatus of claim 25, wherein the selecting the access point identifier configuration procedure comprises determining a timing for configuring the access point identifier for the access point based on the determined type of the access point.

32. The apparatus of claim 31, wherein the configuring comprises configuring the access point with the access point identifier at a time that is based on the timing.

33. The apparatus of claim 25, wherein the selecting the access point identifier configuration procedure comprises selecting an algorithm for generating the access point identifier for the access point based on the determined type of the access point.

34. The apparatus of claim 33, wherein the configuring comprises:
generating the access point identifier for the access point using the algorithm; and
configuring the access point with the access point identifier.

35. A computer-program product, comprising:
a non-transitory computer-readable medium comprising code for causing a computer to:
determine a type of an access point, wherein the type indicates whether the access point is a mobile access point;
select, according to the determined type of the access point, an access point identifier space from an access point identifier domain that is partitioned into a plurality of access point identifier spaces, in which at least one of the plurality of access point identifier spaces is allocated for mobile access points and at least another one of the of the plurality of access point identifier spaces is allocated for stationary access points;
select an access point identifier configuration procedure based on the determined type of the access point; and
configure an access point identifier for the access point based on the selected access point identifier space and the selected access point identifier configuration procedure.

36. The computer-program product of claim 35, wherein the plurality of access point identifier spaces are mutually exclusive.

37. The computer-program product of claim 35, wherein the configuring comprises:
selecting the access point identifier for the access point from the identified identifier space; and
configuring the access point with the access point identifier.

38. The computer-program product of claim 35, wherein the computer-readable medium further comprises code for causing the computer to partition the access point identifier domain into the plurality of access point identifier spaces to mitigate access point identifier collision between mobile access points and stationary access points.

39. The computer-program product of claim 35, wherein the selecting the access point identifier configuration procedure comprises determining a timing for configuring the access point identifier for the access point based on the determined type of the access point.

40. The computer-program product of claim 39, wherein the configuring comprises configuring the access point with the access point identifier at a time that is based on the timing.

41. The computer-program product of claim 35, wherein the selecting the access point identifier configuration procedure comprises selecting an algorithm for generating the access point identifier for the access point based on the determined type of the access point.

42. The computer-program product of claim 41, wherein the configuring comprises:
generating the access point identifier for the access point using the algorithm; and
configuring the access point with the access point identifier.

* * * * *